United States Patent
Chisu

(10) Patent No.: US 10,893,529 B2
(45) Date of Patent: Jan. 12, 2021

(54) UPLINK POWER LIMIT AWARE CELL SELECTION

(71) Applicant: MOTOROLA MOBILITY LLC, Chicago, IL (US)

(72) Inventor: Daniel C. Chisu, Franklin Park, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/258,202

(22) Filed: Jan. 25, 2019

(65) Prior Publication Data

US 2020/0245339 A1   Jul. 30, 2020

(51) Int. Cl.
| | |
|---|---|
| *H04W 72/08* | (2009.01) |
| *H04W 48/16* | (2009.01) |
| *H04W 48/20* | (2009.01) |
| *H04W 52/14* | (2009.01) |
| *H04W 52/36* | (2009.01) |
| *H04W 52/24* | (2009.01) |
| H04W 52/26 | (2009.01) |

(52) U.S. Cl.
CPC .......... *H04W 72/08* (2013.01); *H04W 48/16* (2013.01); *H04W 48/20* (2013.01); *H04W 52/146* (2013.01); *H04W 52/246* (2013.01); *H04W 52/367* (2013.01); *H04W 52/265* (2013.01)

(58) Field of Classification Search
CPC ... H04W 72/08; H04W 48/16; H04W 52/146; H04W 48/20; H04W 52/367; H04W 36/0072; H01Q 1/243
See application file for complete search history.

(56) References Cited

U.S. PATENT DOCUMENTS

| | | | |
|---|---|---|---|
| 2012/0231784 A1* | 9/2012 | Kazmi | H04W 36/0072 455/423 |
| 2019/0020097 A1* | 1/2019 | Chang | H01Q 1/243 |

\* cited by examiner

*Primary Examiner* — Vinncelas Louis
(74) *Attorney, Agent, or Firm* — Yudell Isidore PLLC

(57) ABSTRACT

A communication device, method, and computer program product provide dynamic cell selection with transmit power cut back for local constraints. A transceiver of the communication device scans for cells within communication range of the communication device. An uplink transmit power limit associated with each one of the one or more cells is based at least in part on a maximum transmit power supported by the transceiver. A controller of the communication device determines cuts back of the uplink transmit power limit in response to determining that a local constraint is applicable to the communication device. The controller prioritizes selection of the one or more cells for connecting to the communication device based on the respective uplink transmit power limit contained in the data structure and causes the communication device to connect to the prioritized cell from among the cells.

19 Claims, 7 Drawing Sheets

UPLINK POWER LIMIT AWARE CELL SELECTION

BACKGROUND

1. Technical Field

The present disclosure relates generally to communication devices and the cell selection process of communication devices, and more particularly to communication devices prioritizing selection of cells for connection.

2. Description of the Related Art

When communication devices, such as a user equipment (UE), are switched on, a public land mobile network (PLMN) is selected. For the selected PLMN, the UE determines radio access technologies (RATs) associated with the PLMN that provide appropriate cells for communication services. The UE searches for a suitable cell of the selected PLMN and chooses that cell to provide available communication services. The UE tunes to the frequency of the control channel of the selected cell. This selection by the UE is known as "camping on the cell".

In completing cell selection, a UE uses static cell selection criteria, which prioritizes cells for selection. In Long Term Evolved (LTE) telecommunication protocol, the cell selection criteria uses the maximum transmit power class of the UE for determining a maximum transmit power level that the UE may use in an uplink transmission to the cell. Other telecommunication protocols have similar criteria. The intended purpose of the static selection criteria is to ensure that UEs at cell edge can reach a radio access network (RAN) at maximum power. However, this static selection criteria assumes that the UE will always transmit at its maximum power as defined by its power class. Local constraints may be placed on maximum transmit power by UEs which prevents transmitting at maximum power. The local constraints on transmit power are not related to the level of power required to remain connected to a cell. When such a local constraint on transmit power is imposed, a UE at cell edge may be limited in uplink transmit power in certain frequency bands. Despite having selected a cell according to the defined criteria, the UE may drop off of the cell after repeated connection and access failures, causing a negative impact on user experience, UE performance, and battery service life due to higher current drain during attempts to reconnect.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
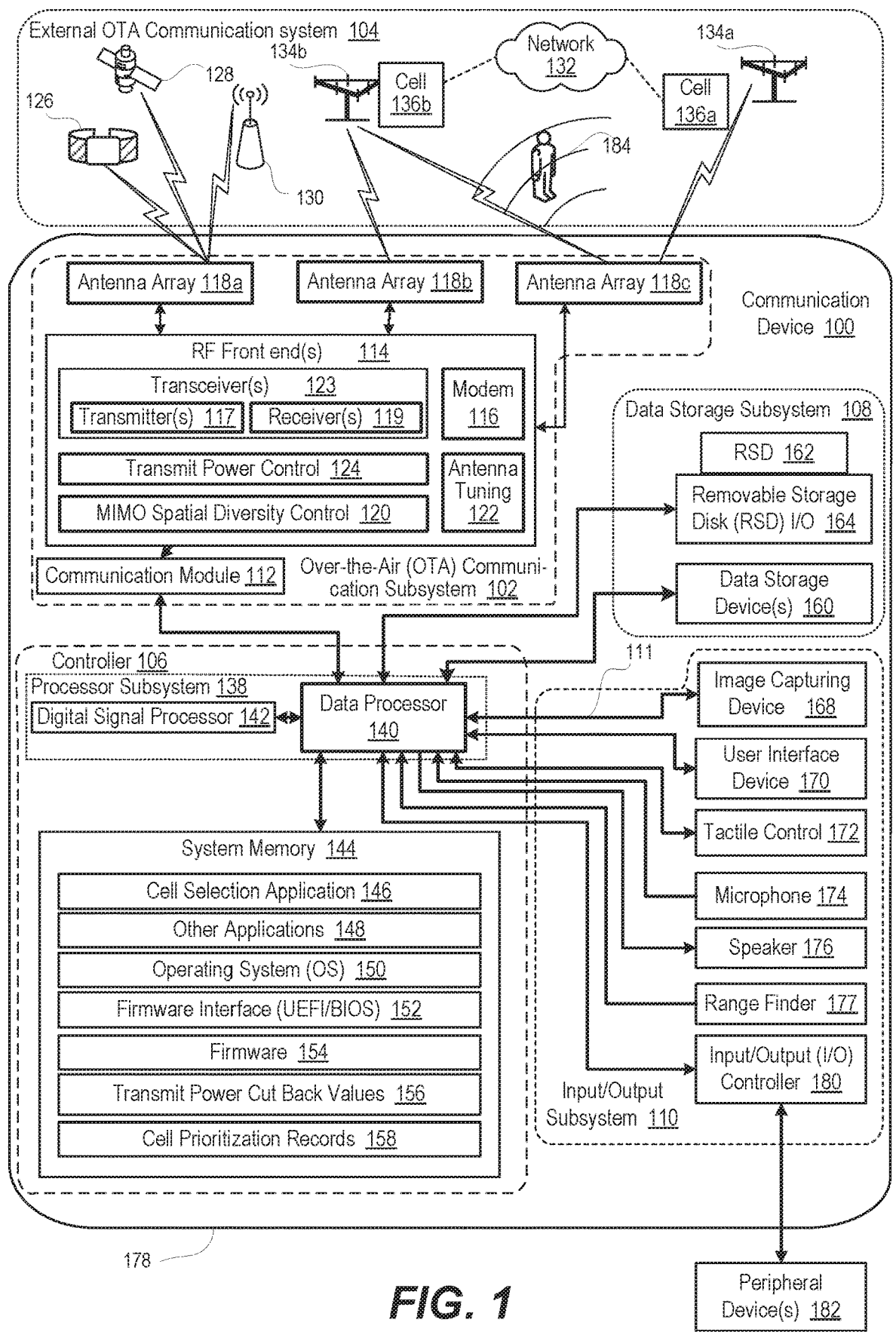
FIG. 1 is a simplified functional block diagram illustrating a communication device that uses dynamic cell selection criteria based in part on transmit power cut back necessitated by a local constraint, according to one or more embodiments.

According to aspects of the present innovation, a communication device, a method, and a computer program product provide for dynamic cell selection based, in part, on transmit power cut back necessitated by a local constraint. A transceiver of the communication device scans for one or more cells within communication range of the communication device. The transceiver supports a maximum transmit power. An uplink transmit power limit of the transceiver associated with each one of the one or more cells is determined, based, at least in part, on the maximum transmit power. A determination is made whether a local constraint is applicable to the communication device. The local constraint requires uplink transmit power to be less than the maximum transmit power. The uplink transmit power limit is cut back in response to determining that the local constraint is applicable. Selection of the one or more cells for connecting with the communication device is prioritized based, at least in part, on the uplink transmit power limit respective to each cell. The communication device connects to a highest prioritized cell among the one or more cells, based on a priority associated respectively with each of the one or more cells.

The present innovation provides a method for cell selection and reselection with dynamic maximum transmit power level that is adjusted for local constraints that require cut back of the transmit power level. In one or more aspects, the present innovation improves cell selection criteria by replacing a static maximum transmit power (maxTxPwr) value based on maximum transmit power of the UE with a dynamic value that represents maxTxPwr with any required cut back required for a local constraint on the communication device. In one or more embodiments, the local constraint is based on human/device interaction states or antenna impairment states. When evaluating or re-evaluating selection criteria, the UE dynamically checks for whether the local constraint is still applicable. Selection is biased toward communication bands with lower cut backs over other communication bands with higher cut backs, which is helpful in avoiding dropping off of a selected cell. For example, higher transmit power cut backs may be associated with higher-frequency communication bands. With improved cell selection based on realistic uplink transmit power levels, user experience is increased with more dependable performance at cell edges. The UE will not fail call attempts or abandon connection attempts due to failure using radio access channel (RACH) procedure. Consequently, transmit power and thus battery service life are conserved.

In one aspect of the present disclosure, a communication device includes a transmitter that supports a maximum transmit power. The communication device includes a memory having a data structure containing information identifying prioritized cells for connecting by the transmitter. The communication device includes a controller that is communicatively coupled to the transmitter and the memory. The controller enables the electronic device to scan, by the transceiver, for one or more cells within communication range of the communication device. The controller enables the electronic device to determine an uplink transmit power limit of the transceiver associated with each one of the one or more cells that is based at least in part on the maximum transmit power. The controller enables the electronic device to determine whether the electronic device is subject to a local constraint. The local constraint requires uplink transmit power to be less than the maximum transmit power. The controller cuts back the uplink transmit power limit, in response to determining that the local constraint is applicable. The controller prioritizes selection of the one or more cells for connecting to the communication device, based, at least in part, on the respective uplink transmit power limit contained in the data structure. The controller enables the communication device to connect to the highest prioritized cell of the one or more cells.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a simplified functional block diagram illustrating example communication device 100 that uses dynamic cell selection criteria based, in part, on transmit power cut back necessitated by a local constraint. Communication device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, communication device 100 can be one of, and also be referred to as, a system, device, subscriber unit, subscriber station, mobile station (MS), mobile, mobile device, remote station, remote terminal, user terminal, terminal, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. These various devices all provide and/or include the necessary hardware and software to support the various wireless or wired communication functions as part of a communication system. Communication device 100 can also be an over-the-air link in a communication system. Communication device 100 can be intended to be portable, hand-held, or fixed in location. Examples of such over-the-air link communication devices (100) include a wireless modem, an access point, a repeater, a wirelessly-enabled kiosk or appliance, a femtocell, a small coverage area node, and a wireless sensor, etc.

Referring now to the specific component makeup and the associated functionality of the presented components, communication device 100 includes over-the-air (OTA) communication subsystem 102 that communicates with external OTA communication system 104. Communication device 100 provides computing and data storage functionality in support of OTA communication with external OTA communication system 104, as well as other functions, with controller 106, data storage subsystem 108, and input/output (I/O) subsystem 110 that are communicatively coupled to each other via a system interlink 111.

OTA communication subsystem 102 includes communication module 112 that operates in baseband to encode data for transmission and decodes received data, according to an applicable communication protocol. OTA communication subsystem 102 includes radio frequency (RF) front end(s) 114 having one or more modems 116. Modems 116 modulate baseband encoded data from communication module 112 onto a carrier signal to provide a transmit signal that is amplified by transmitter(s) 117. Antenna arrays 118a-c transmit and receive signals. In one or more embodiments, communication device 100 can include one antenna array 118a. In one or more embodiments, communication device 100 can include two antenna arrays 118a-b. In one or more embodiments, communication device 100 can include more than three antenna arrays (not shown). Modem 116 demodulates the received signal from antenna arrays 118a-c. The received signal is amplified and filtered by receiver(s) 119, separating received encoded data from a received carrier signal. Multiple-input multiple-output (MIMO) spatial diversity control 120 can utilize antenna elements within one or more antenna arrays 118a-c to actively directionally steer antenna gain to improve communication performance. Antenna tuning circuitry 122 adjusts antenna impedance of antenna arrays 118a-c to improve antenna efficiency at desired transmit or receive frequencies of transmitters 117 and receivers 119, respectively, within transceiver(s) 123. RF front end(s) 114 includes transmit power control 124 to adjust uplink transmit power, as required, to effectively communicate with external OTA communication system 104.

Controller 106 controls the communication, user interface, and other functions and/or operations of communication device 100. These functions and/or operations include, but are not limited to including, application data processing and signal processing. Communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections are illustrated in FIG. 1, it is to be understood that more, fewer, or different interconnections may be present in other embodiments.

In one or more embodiments, controller 106, via OTA communication subsystem 102, can perform multiple types of OTA communication with external OTA communication system 104. OTA communication subsystem 102 can communicate with one or more of a personal access network (PAN) device, such as smart watch 126, via a Bluetooth wireless link, global positioning system (GPS) satellite 128, and node 130 of a wireless local access network (WLAN). WLAN node 130 is in turn connected to a wide area network 132, such as the Internet. OTA communication subsystem 102 can also communicate with one of radio access networks (RANs) 134a-b having respective base stations (BSs) or cells 136a-b. RANs 134a-b are a part of a wireless wide area network (WWAN) that is connected to network 132 and provides data or voice services. Cells 136a-b generally require uplink transmit power levels that are much higher than the low power PAN and WLAN.

Controller 106 includes processor subsystem 138 that executes program code to provide functionality of the communication device 100. Processor subsystem 138 includes one or more central processing units (CPUs) ("data processor") 140. Processing subsystem 138 can include a digital signal processor (DSP) 142. Controller 106 includes system memory 144 for containing actively used program code and data. System memory 144 can include therein a plurality of such program code and modules, including applications such as cell selection application 146 and other applications 148. System memory 144 can also include operating system (OS) 150, firmware interface 152 such as basic input/output system (BIOS) or Uniform Extensible Firmware Interface (UEFI), and platform firmware 154. These software and/or firmware modules have varying functionality when their corresponding program code is executed by processor subsystem 138 or secondary processing devices within communication device 100. Data, such as transmit power cut back values 156 and cell prioritization records 158, is stored in system memory 144.

Data storage subsystem 108 provides nonvolatile storage accessible to controller 106. For example, data storage subsystem 108 can provide a large selection of other applications 148 that can be loaded into system memory 144. Local data storage device(s) 160 can include hard disk drives (HDDs), optical disk drives, solid state drives (SSDs), etc. In one or more embodiments, removable storage device (RSD) 162 that is received in RSD interface 164 is a computer readable storage device, which can be referred to as non-transitory. RSD 162 is an example of a computer program product that can be accessed by controller 106 to provision communication device 100 with program code that when executed by controller 106 provides the functionality to communication device 100 to perform aspects of the present innovation described herein.

I/O subsystem 110 provides input and output devices, such as for presenting or receiving content that is carried by OTA communication. For example, image capturing device 168, such as a camera, can receive gestures and other image data. User interface device 170 can present visual or tactile outputs as well as receive user inputs. Tactile/haptic control 172 can provide an interface such as for braille reading or manual inputs. Microphone 174 receives user audible inputs. Audio speaker 176 can provide audio output, including audio playback and alerts. Range finder 177 can emit a waveform of energy, such as acoustic, infrared, radio frequency (RF), etc., whose time of flight is used to measure distance to a reflecting object. I/O subsystem 110 can be wholly or substantially encompassed by device housing 178 or be connected via I/O controller 180 as peripheral device 182. I/O controller 180 can also interface with wired local access network (LAN).

Controller 106 responds to triggering events by selecting or reselecting cells 136a-b for connection. Examples of triggering events include initial turn on of communication device 100 and/or waking up of communication device 100 from an inactive state, such as for battery conservation. As another example, triggering events can include a periodic reselection so that prioritization is dynamically updated to respond to changes in circumstances and/or local constraints of communication device. For example, distance to cells 136*a-b* can change for communication devices 100 that are mobile.

Connection of communication device 100 to selected cell 136*a-b* can be in different modes. Communication device 100 can camp on selected cell 136*a-b* in either a registered or unregistered status in order to monitor and receive control channel messages. Certain services require that communication device 100 register with selected cell 136*a-b* so that selected cell 136*a-b* can directly page communication device 100. Other services are broadcast such that unregistered communication devices 100 can participate. Communication device 100 can initiate a communication session with another network or user device via the selected cell 136*a-b* such as by utilizing a random access channel (RACH) procedure using control information obtained during cell selection.

During cell selection or reselection, controller 106 dynamically determines whether a local constraint requires a cut back to occur on maximum transmit power level. Controller 106 enables communication device 100 to determine whether any target, such as person 184, is present that imposes a local constraint on maximum transmit power. In one or more embodiments, controller detects person 184 based on one or more sensed inputs. The presence of person 184 imposes the local constraint. Controller 106 can determine that person 184 is within a proximity distance to communication device 100, based on image recognition by image capturing device 168 of communication device 100. Controller 106 can determine that person 184 is within a proximity distance to communication device 100 using range finder 177 to detect time of flight of a range finding transmission by communication device 100. Controller 106 can determine that person 184 is within a proximity distance to communication device 100 by recognizing human speech in audio detected by microphone 174 of communication device 100. Controller 106 can also determine that person 184 is within a proximity distance to communication device 100 by recognizing a target in back scatter RF energy that is detected by RF front end(s) 114. Controller 106 can further determine that person 184 is within a proximity distance to communication device 100 by detecting that person 184 is touching a sensor of communication device 100. Communication device 100 can include sensors dedicated to detecting how person 184 is holding or carrying communication device 100. Certain components of communication device 100 incorporate sensors, such as user interface device 170, that is responsive to user touch. Controller 106 can determine that person 184 is within a proximity distance to communication device 100 based on detecting antenna blocking that detunes at least one antenna array 118*a-c*. Electromagnetic coupling with nearby targets such as person 184 changes the antenna impedance. Thus, controller 106 can detect blocking of one of antenna arrays 118*a-c* based on changes in antenna impedance detected by antenna tuning circuitry 122.

For clarity, person 184 is described in various scenarios herein in proximity to communication device that are deemed to impose a local constraint on uplink transmit power. In one or more embodiments, communication device 100 can determine proximity to certain types of non-person obstructions and/or specific locations that are also designated as local constraints. In an example, communication device 100 can detect being in a location with equipment that is sensitive to uplink transmissions: (i) a hospital; (ii) a gas station; (iii) and an inflight passenger airplane.

In one or more embodiments, in determining whether a local constraint is applicable to communication device 100, where the local constraint requires uplink transmit power to be less than the maximum transmit power, controller 106 enables communication device 100 to: (i) determine a respective direction of each one of the one or more cells 136*a-b*; and (ii) determine whether any target such as person 184 is present in the respective direction of each one of the one or more cells 136*a-b*. In response to determining that a particular target is present in the respective direction of a particular one of the one or more cells 136*a-b*, controller 106 enables communication device 100 to: (a) determine the uplink transmit power limit based on the presence of the particular target; and (b) associate the determined uplink transmit power limit with the particular one of the one or more cells 136*a-b*. In particular embodiments, in response to prioritizing a cell among the one or more cells 136*a-b*, controller 106 enables communication device 100 to achieve at least a portion of the uplink transmit power by connecting to the highest prioritized cell among the one or more cells 136*a-b* using spatial diversity.

In one or more embodiments, in determining whether a local constraint is applicable to the communication device, where the local constraint requires uplink transmit power to be less than the maximum transmit power, controller 106 enables communication device 100 to scan for the one or more cells using a subset of antenna arrays 118*a-c*. In determining the required uplink transmit power level for each of the one or more cells 136*a-b*, controller 106 enables communication device 100 to: (i) determine whether any of the two or more antenna arrays 118*a-c* are blocked by proximity of a target; (ii) determine the uplink transmit power level based on available antenna gain to connect to each of the one or more cells 136*a-b* using at least one antenna 118*a-c* that remains unblocked; and (iii), connect to a prioritized cell among the one or more cells 136*a-b* using the at least one antenna 118*a-c* that remains unblocked. In at least one particular embodiment, controller 106 enables communication device 100 to determine whether any of the two or more antennas 118*a-c* are blocked by proximity of a target by detecting that a particular antenna is detuned because of a portion of a person touching communication device 100.

In one or more embodiments, controller 106 enables communication device 100 to determine the required uplink transmit power level based on one or more of: (i) detecting a path loss to each of the one or more cells 136*a-b*; (ii) detecting any obstruction between communication device 100 and each of the one or more cells 136*a-b*; and (iii) detecting an interference source between communication device 100 and each of the one or more cells 136*a-b*. Path loss is the reduction in power density that occurs as a radio wave propagates over a distance. The primary factor in path loss is the decrease in signal strength over distance of the radio waves themselves. Radio waves follow an inverse square law for power density: the power density is proportional to the inverse square of the distance. Every time the distance is doubled, the received power is only one-fourth as strong. Thus, each 6-dBm increase in output power doubles the possible distance from the cell that is achievable. In one or more embodiments, path loss between communication device 100 and cells 136*a-b* can change, such as due to communication device 100 moving closer to or farther away from cells 136*a-b*. Applicability of a local constraint can also change, such as a person moving from being present to not being present within a proximity distance to communication device 100. Communication device 100 periodically rescans cells 136a-b and updates prioritization information for cell selection.

In one or more embodiments, in determining whether a local constraint is applicable to communication device 100, controller 106 enables communication device 100 to: (i) determine an orientation of communication device 100 relative to a direction to each of the one or more cells 136a-b; (ii) determine a corresponding antenna gain of communication device 100 associated with the respective orientation; and (iii) associate an uplink transmit limit based, at least in part, on the corresponding antenna gain.

In one or more embodiments, in determining the required uplink transmit power level, controller 106 enables communication device 100 to: (i) determine that a first cell 136a requires a first uplink transmit frequency and that a second cell 136b requires a second uplink transmit frequency; (ii) associate the first and second uplink transmit frequencies with preset first and second transmit power limits that are different and that are applicable when the device is within a proximity distance to a person; and, (iii) in response to determining that a person is within the proximity distance to communication device 100, adjust a corresponding first and second transmit power limit for the first and second cells 136a-b to remain within the respective first and second transmit power limits.

Figure 2:
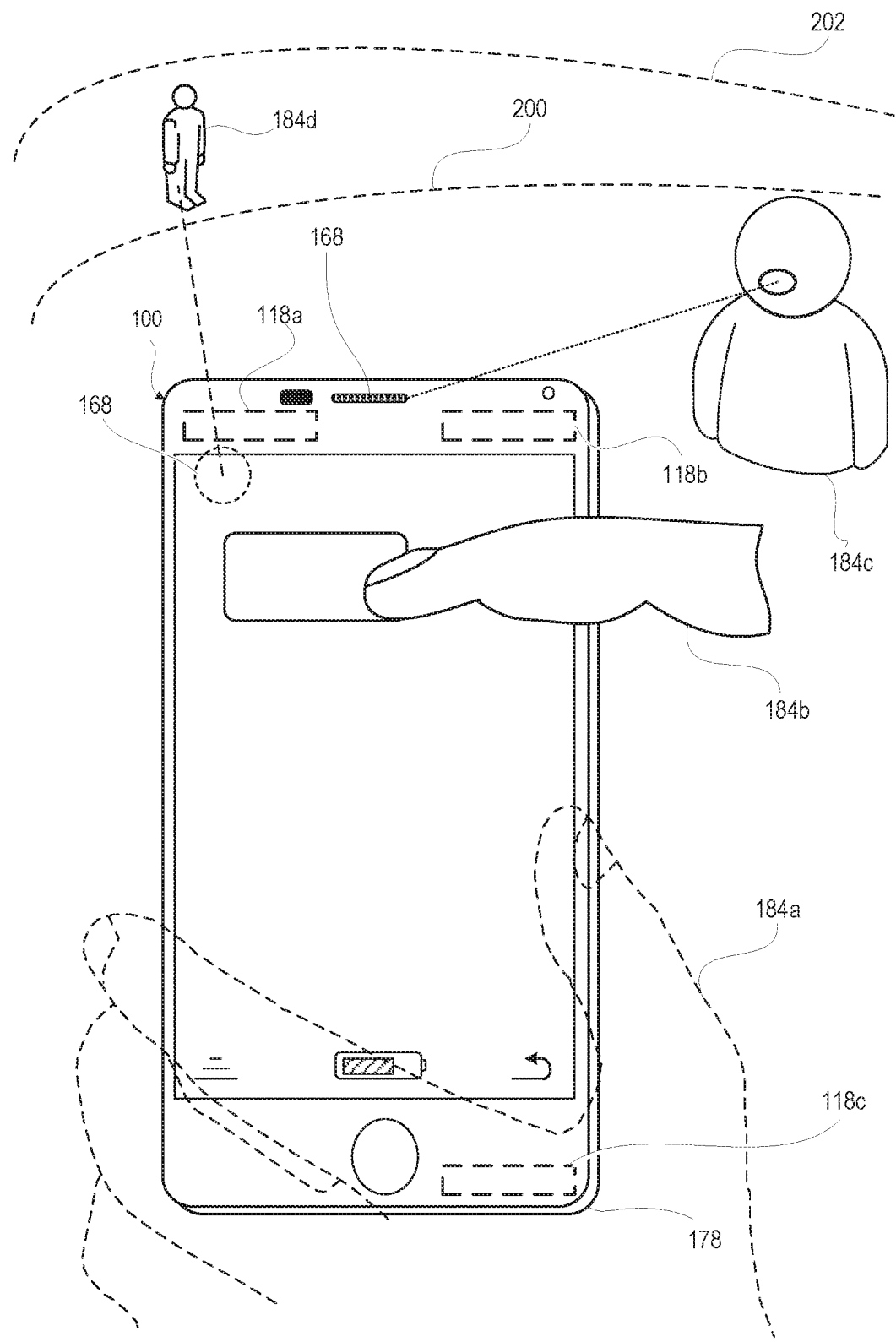
FIG. 2 is a diagram illustrating the communication device that determines graduated degrees of a local constraint that are associated with different uplink transmit power limits, according to one or more embodiments.

In one or more embodiments, FIG. 2 is a diagram of communication device 100 that determines graduated degrees of a local constraint that are associated with different uplink transmit power limits. Communication device 100 detects whether person 184 (FIG. 1) is within a particular degree of a local constraint to the communication device 100. In an illustrative example, four (4) degrees of a local constraint are illustrated by positions of person 184 (FIG. 1). The reference numeral "184" refers to persons in general whether or not proximate to communication device 100. Specific suffices (a, b, c, d) added to reference numeral "184" refer to specific degrees of proximity of person 184. In illustrative scenarios, persons 184a-d are ordered from closest to farthest from communication device 100. In one or more embodiments, the number of degrees can be fewer or greater than 4. As a first example of degrees of a local constraint, person 184a is touching a portion of device housing 178 of communication device 100. Antenna 118c underlies the portion of device housing 178 that is touched by person 184a. A corresponding first uplink transmit power cutoff, power level "A", requires a lowest power level, such as turning off antenna 118c and using one or both of antennas 118a-b. As a second example of degrees of a local constraint, person 184b is touching a portion of device housing 178 of communication device 100 that does not have an underlying antenna. A corresponding second uplink transmit power cutoff allows use of antennas 118a-c at a power level B that is greater than power level A. The same second uplink transmit power cutoff, power level B, applies to antennas 118a-b for the first example of person 184a. As a third example of degrees of a local constraint, person 184c is not touching a portion of device housing 178 of communication device 100. Person 184c is within first proximity distance 200 to communication device 100. Person 184c is speaking toward communication device 100. Proximity is detected by microphone 174. A corresponding third uplink transmit power cutoff allows use of antennas 118a-c at a power level C that is greater than power level B.

As another example of degrees of a local constraint, person 184d is not touching a portion of device housing 178 of communication device 100. Range finding device 177 or image capturing device 168 determines distance to person 184d. Person 184d is beyond first proximity distance 200 and within a second proximity distance 202. At this distance, person 184d can be a pedestrian passing through a vicinity of an unattended communication device 100. At this distance, person 184d can be listening to speaker 176 of communication device 100. A corresponding fourth uplink transmit power cutoff allows use of antennas 118a-c at a power level D that is greater than the power level C. Targets detected beyond second proximity distance 202 do not trigger a local constraint. The uplink transmit power limit is allowed to be the same as the maximum transmit power, greater than power level D, without a cut back based on a local constraint.

In one or more embodiments, the graduated uplink transmit power limits are determined to be based on predicted power level that would be present at a distance of persons 184a-d from any active antennas 118a-c. Distance can be approximately determined based on a manner of interaction such as holding, touching, hands-free, or being in the vicinity.

Figure 3:
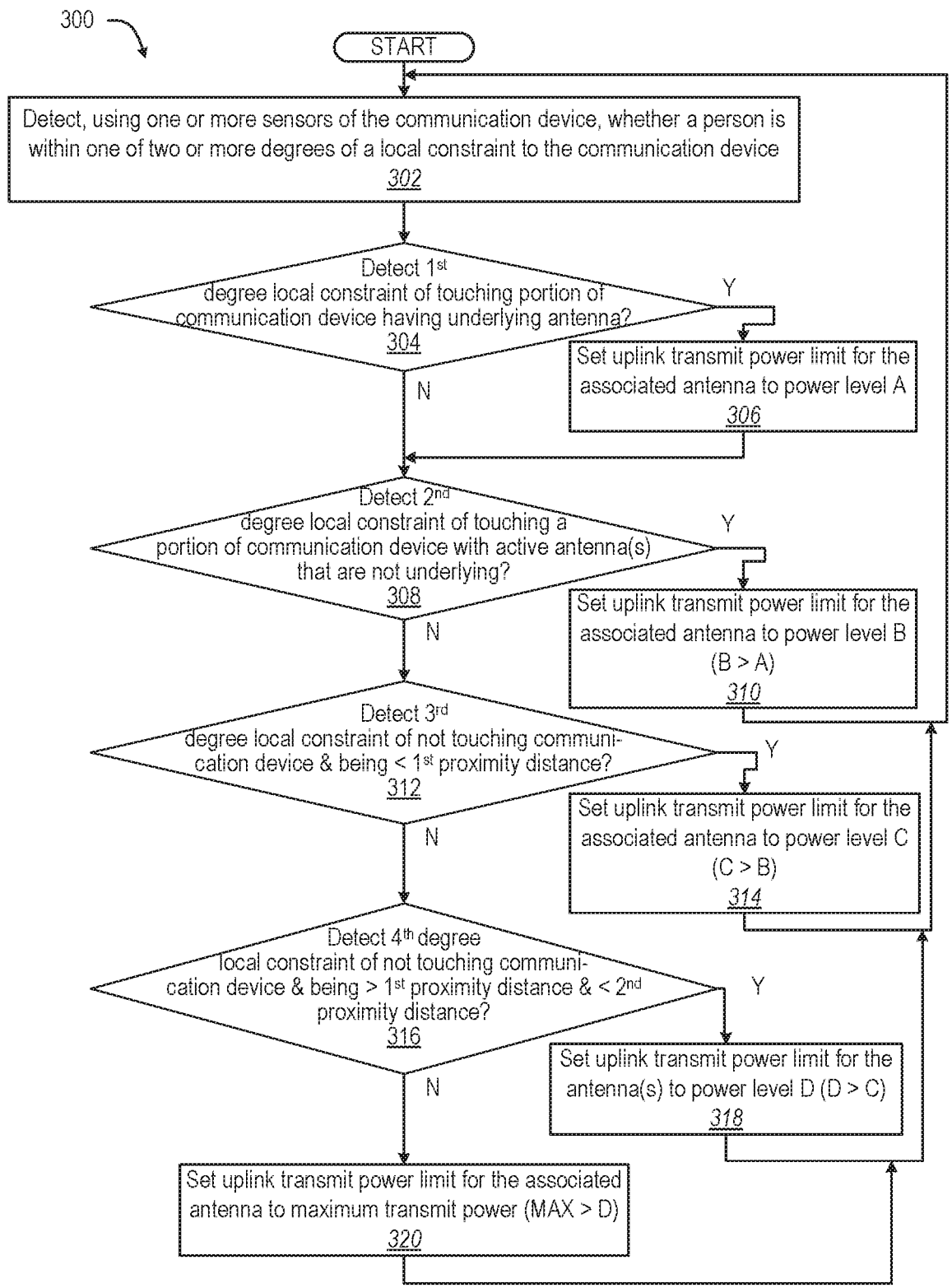
FIG. 3 is a flow diagram illustrating a method for determining graduated degrees of a local constraint that are associated with different uplink transmit power limits, according to one or more embodiments.

FIG. 3 is a flow diagram illustrating method 300 for determining graduated degrees of a local constraint that are associated with different uplink transmit power limits. In one or more embodiments, method 300 includes detecting, using one or more sensors of communication device 100 (FIG. 1), whether a person is within one of two or more degrees of a local constraint to the communication device (block 302). A determination is made whether a first degree of the local constraint was detected of a person touching a portion of the communication device having an underlying antenna (decision block 304). In response to determining that the first degree of the local constraint was detected, method 300 includes setting uplink transmit power for the associated antenna to power level A (block 306). In one or more embodiments, power level A is turning off transmission by the associated antenna. Method 300 includes determining whether a second degree of the local constraint was detected of a person touching a portion of the communication device having active antennas that are not underlying the portion touched (decision block 308). In response to determining that the second degree of the local constraint is detected, method 300 includes setting uplink transmit power for the associated (not underlying) antenna(s) to a power level B that is greater than power level A (block 310). Then method 300 returns to block 302. In response to determining that the first degree of the local constraint was not detected in decision block 304, method 300 proceeds to block 308. In response to determining that the second degree of the local constraint was not detected in decision block 308, method 300 includes determining whether a third degree of the local constraint was detected of a person being within a first proximity distance that is not touching the communication device (decision block 312). In response to determining that the third degree is detected, method 300 includes setting the uplink transmit power limit to a power level C that is greater than power level B (block 314). Then method 300 returns to block 302. In response to determining that the third degree of the local constraint was not detected in decision block 312, method 300 includes determining whether a fourth degree of the local constraint was detected of a person that is not touching the communication device and being beyond the first proximity distance but within a second proximity distance (decision block 316). In response to determining that the fourth degree is detected, method 300 includes setting the uplink transmit power limit to power level D that is greater than power level C but less than the maximum power level (block 318). Then method 300 returns to block 302. In response to determining that the fourth degree is not detected in decision block 316, method 300 includes setting the uplink transmit power limit to the maximum power level (block 320). Then method 300 returns to block 302.

Figure 4A:
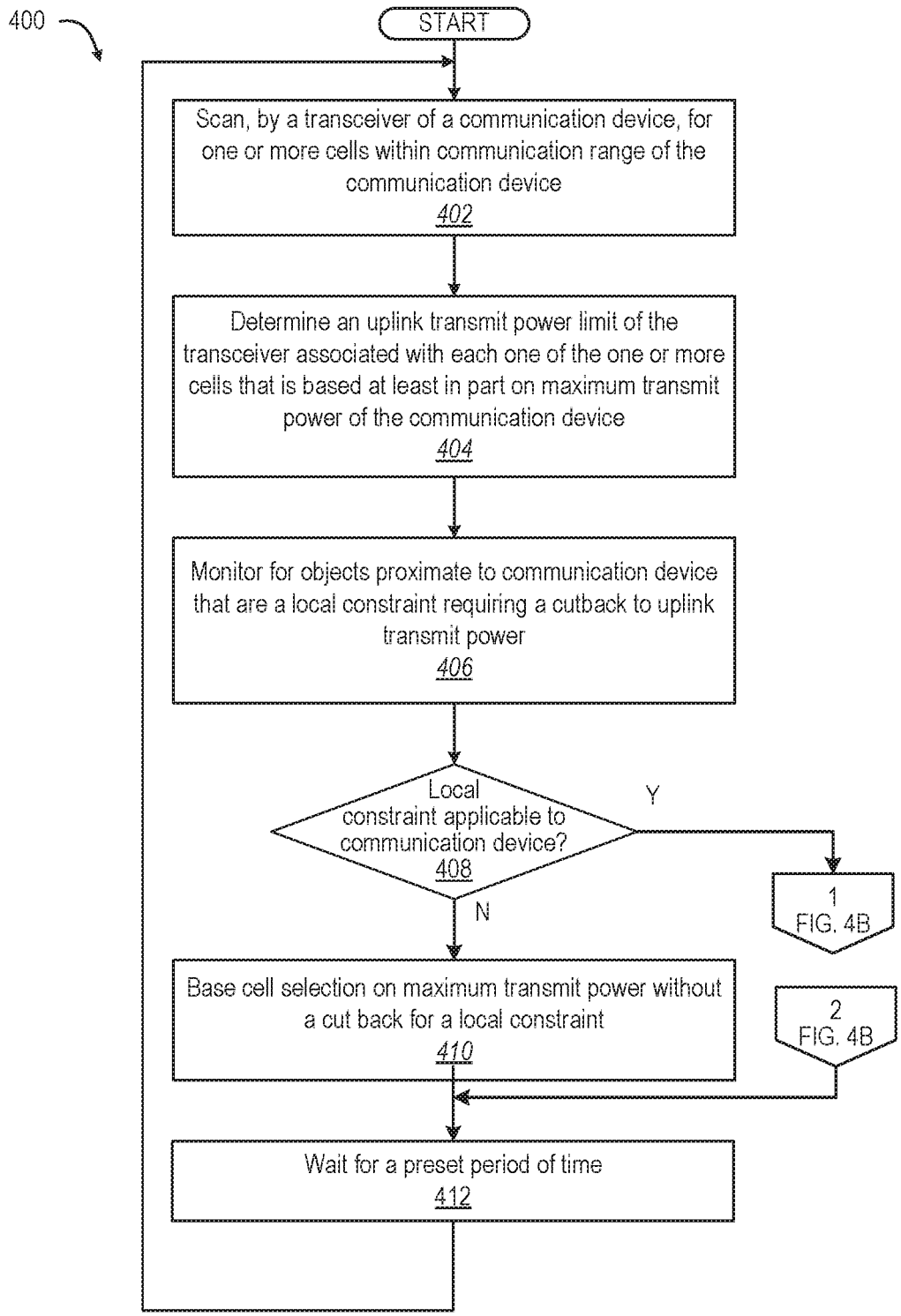
FIGS. 4A-4B are a flow diagram illustrating a method for dynamic cell selection criteria based on local constraints, according to one or more embodiments.
Figure 4B:
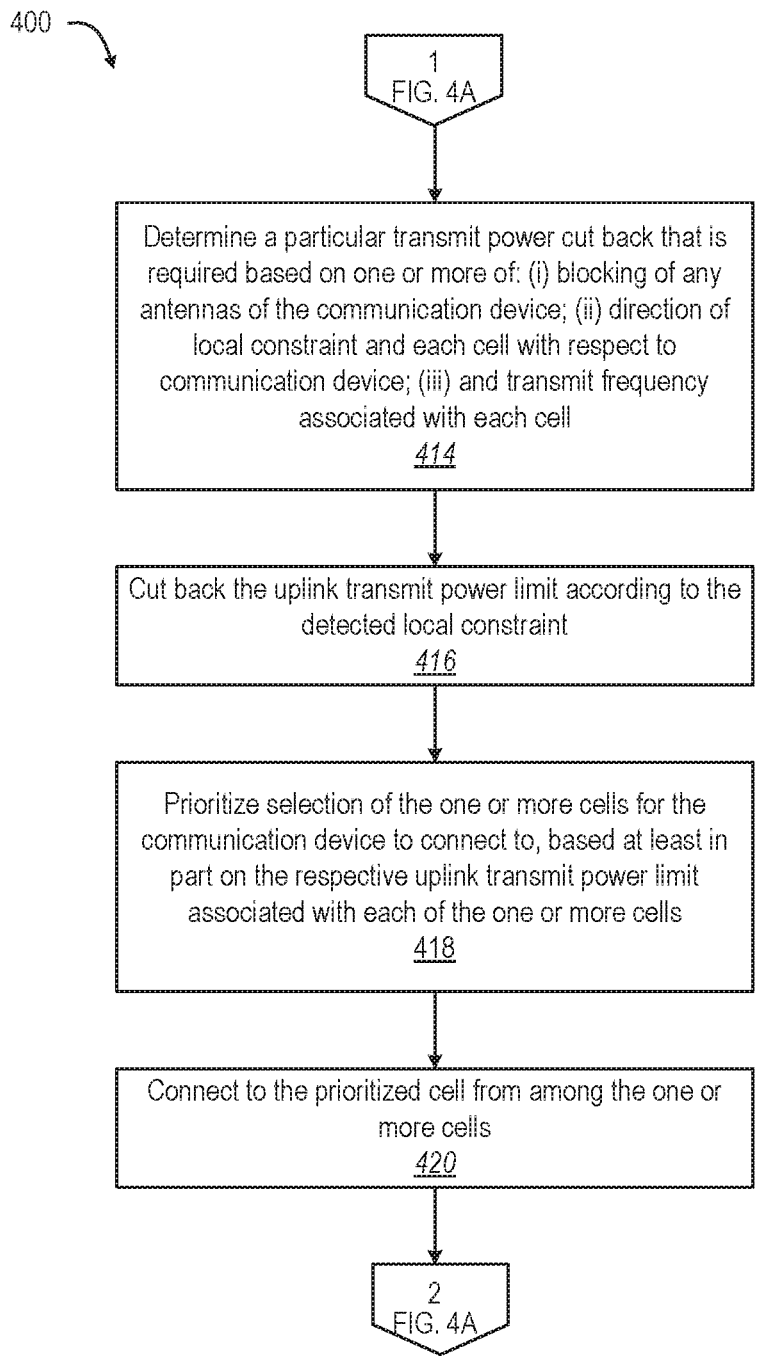

FIGS. 4A-4B provide a flow diagram illustrating method 400 for dynamic cell selection based on local constraints. With initial reference to FIG. 4A, method 400 includes scanning, by transceiver 123 of communication device 100 (FIG. 1), for one or more cells within communication range of the communication device (block 402). The transceiver supports a maximum transmit power. Method 400 includes determining, by controller 106 of communication device 100, an uplink transmit power limit of the transceiver associated with each one of the one or more cells, the uplink transmit power limit being based, at least in part, on the maximum transmit power (block 404). Method 400 includes monitoring for objects proximate to communication device 100 that present a local constraint requiring a cutback to uplink transmit power (block 406). A determination is made whether a local constraint, such as the presence of a person, is detected or identified that requires uplink transmit power to be less than the maximum transmit power (decision block 408). In response to determining that a local constraint, such as presence of a person, is not applicable, method 400 includes basing cell selection on the maximum transmit power without a cut back for a local constraint (block 410). Method 400 includes waiting for a preset period of time (block 412). Then method 400 returns to block 402. During the preset period of time, the status of a local constraint can change. Also, a path loss to one or more cells can change. For example, the communication device can move closer or farther away to a particular cell.

With reference to FIG. 4B, in response to determining that a local constraint is applicable, method 400 includes determining a particular transmit power cut back that is required based on one or more of: (i) blocking of any antennas of the communication device; (ii) direction of local constraint and each cell with respect to communication device; and (iii) transmit frequency associated with each cell (block 414). Method 400 includes cutting back the uplink transmit power limit according to the detected local constraint (block 416). Method 400 includes prioritizing selection of the one or more cells for the communication device 100 (FIG. 1) to connect to, based at least in part on the respective uplink transmit power limit associated with each of the one or more cells (block 418). Method 400 includes connecting to the prioritized cell from among the one or more cells (block 420). Then method 400 returns to block 412 (FIG. 4A).

Figure 5:
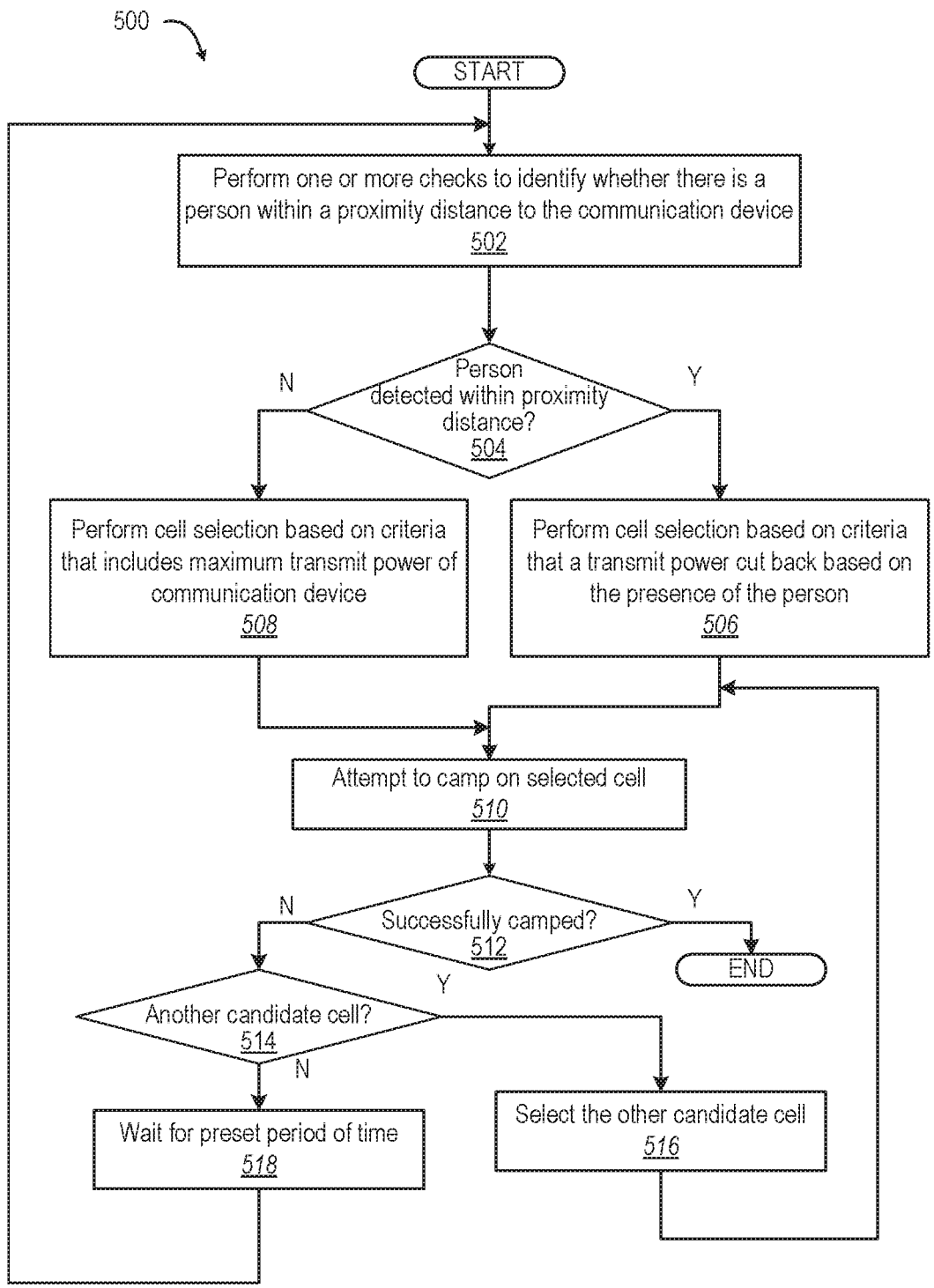
FIG. 5 is a flow diagram illustrating a method for cell selection prioritization that dynamically accounts for presence of a person proximate to a communication device, according to one or more embodiments.

FIG. 5 is a flow diagram illustrating method 500 for prioritization cell selection that dynamically accounts for presence of a person being within a proximity distance to communication device 100 (FIG. 1). Method 500 includes performing one or more checks to identify whether there is a person within a proximity distance to the communication device (block 502). According to the disclosure, the one or more checks can include one or more of: (i) image recognition by an image capturing device of the communication device; (ii) range finding by time of flight of a range finding transmission by the communication device; (iii) human speech detection by at least one microphone of the communication device; (iv) detection of a person based on back scatter return of a radio frequency (RF) transmit signal from the transceiver; (v) touch detection detected by a sensor of the communication device; and (vi) antenna blocking detection based on detuning of at least one antenna. A determination is made whether a person is detected within the proximity distance (decision block 504). In response to detecting a person, method 500 includes performing cell selection based on criteria involving a transmit power cut back that is required because of the presence of the person (block 506). In response to not detecting a person, method 500 includes performing cell selection based on criteria that includes maximum transmit power of the communication device (block 508). After cell selection is completed in either blocks 506 or 508, method 500 includes attempting to camp on selected cell (block 510). A determination is made whether communication device successfully camped on the selected cell (decision block 512). The communication device, if necessary for applicable communication services, registers its presence with the selected cell. While camping on the cell, the communication device: (i) receives system information from the cell of a public land mobile network (PLMN); (ii) can establish a radio resource control (RRC) connection; (iii) can receive paging and warning messages; and (iv) can receive multimedia broadcast—multicast service. In response to communication device successfully camping on the selected cell, method 500 ends.

In response to communication device not successfully camping on the selected cell, method 500 determines whether another candidate cell remains (decision block 514). Candidate cells can include a previous cell on which the communication device previously camped prior to the unsuccessful attempt to camp on the highest priority cell. Promptly reverting back to the previous cell can prevent loss of communication service. In response to determining that another candidate cell remains, method 500 includes selecting the other candidate cell (block 516). Then method 500 returns to block 510. In response to determining that no other candidate cell remains, method 500 includes waiting for a preset period of time to allow for a change in the presence of the person or path loss to a particular cell (block 518). Then method 500 returns to block 502.

Figure 6:
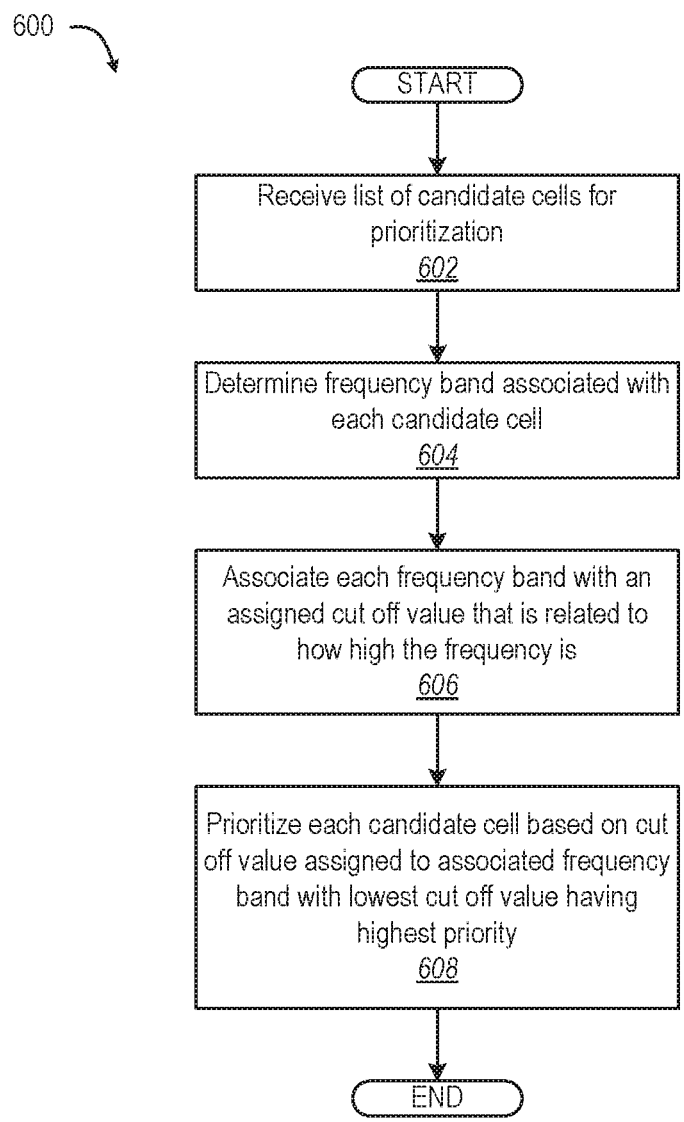
FIG. 6 is a flow diagram illustrating a method for cell selection prioritization based on cell bands that have different levels of cut back, according to one or more embodiments.

FIG. 6 is a flow diagram illustrating an example method 600 for prioritization of cell selection based on cell bands that have different levels of cut back. Method 600 includes receiving, by controller 106 (FIG. 1), a list of candidate cells for prioritization (block 602). Method 600 includes determining a frequency band associated with each candidate cell (block 604). Method 600 includes associating each frequency band with an assigned cut off value that is related to how high the frequency band is (block 606). Method 600 includes prioritizing each candidate cell based on the cut off value assigned to the associated frequency band, with the cell having the lowest cut off value having the highest priority (block 608). Then method 600 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
    scanning, by a transceiver of a communication device, for cells within communication range of the communication device, the transceiver supporting a maximum transmit power;
    determining an uplink transmit power limit of the transceiver associated with each one of the cells, the uplink transmit power limit based, at least in part, on the maximum transmit power;
    determining, based on a proximity of a target, whether a local constraint is applicable to the communication device, each local constraint requiring uplink transmit power to be less than the maximum transmit power, and each local constraint representing a graduated degree of local constraint that corresponds to a specific degree of proximity of the target and that is associated with a different uplink transmit power limit;
    in response to determining that the local constraint is applicable, cutting back the uplink transmit power limit to the uplink transmit power limit associated with the applicable local constraint;
    prioritizing selection of the cells for connecting to the communication device, based at least in part on the respective uplink transmit power limit, by giving highest priority to a prioritized cell having a lowest cut back; and
    connecting to the prioritized cell among the cells.

2. The method of claim 1, wherein determining whether the local constraint is applicable to the communication device comprises:
    determining a respective direction of each one of the cells;
    determining whether any target is present in the respective direction of each one of the cells; and
    in response to determining that a particular target is present in the respective direction of a particular one of the cells:
        determining the uplink transmit power limit based on the local constraint of the presence of the particular target; and
        associating the determined uplink transmit power limit with the particular one of the cells; and
    wherein connecting to the prioritized cell among the cells comprises transmitting via at least two antennas of the communication device using spatial diversity to achieve at, least a portion of the uplink transmit power.

3. The method of claim 1, wherein determining whether said local constraint is applicable comprises detecting a person within a proximity distance to the communication device based on one or more of: (i) image recognition by an image capturing device of the communication device; (ii) range finding by time of flight of a range finding transmission by the communication device; (iii) human speech detection by at least one microphone of the communication device; (iv) detection of a person based on back scatter return of a radio frequency (RF) transmit signal from the transceiver; (v) touch detection detected by a sensor of the communication device; and (vi) antenna blocking detection based on detuning of at least one antenna.

4. The method of claim 1, wherein determining whether said local constraint is applicable comprises:
    determining a subset of antennas of two or more antennas of the communication device that are capable of transmitting to a particular one of the cells; and
    determining whether a local constraint is applicable to the communication device that requires uplink transmit power to be less than the maximum transmit power by:
        determining whether any of the two or more antennas are blocked by said proximity of said target; and
        determining an uplink transmit power level based on available antenna gain to connect to each of the cells using at least one antenna of the two or more antennas that remain unblocked; and connecting to the prioritized cell among the cells using the at least one antenna of the two or more antennas that remain unblocked.

5. The method of claim 4, wherein determining the required uplink transmit power level comprises one or more of: (i) detecting a path loss to each of the cells; (ii) detecting any obstruction between the communication device and each of the cells that creates the local constraint; and (iii) detecting an interference source between the communication device and each of the cells.

6. The method of claim 1, wherein determining whether said local constraint is applicable to the communication device that requires uplink transmit power to be less than the maximum transmit power comprises:
   determining an orientation of the communication device relative to a direction to each of the cells;
   determining a corresponding antenna gain of the communication device associated with the respective orientation; and
   associating the uplink transmit power limit, based at least in part on the corresponding antenna gain.

7. The method of claim 1, wherein determining whether said local constraint is applicable to the communication device comprises:
   determining that a first cell requires a first uplink transmit frequency and that a second cell requires a second uplink transmit frequency;
   associating the first and second uplink transmit frequencies with preset first and second local constraints having different transmit power cutbacks that are applicable within a proximity distance to a person; and
   in response to determining that said person is within the proximity distance to the communication device, adjusting a corresponding first and second transmit power limit for the first and second cells to remain within the respective first and second transmit power limits.

8. The method of claim 1, wherein determining whether the local constraint is applicable to the communication device comprises:
   detecting, using one or more sensors of the communication device, whether a person is within one of two or more degree of said local constraint to the communication devices, the two or more degrees of local constraint comprising at least two of: (i) touching a portion of the communication device having an underlying antenna; (ii) touching a portion of the communication device not having an underlying antenna; (iii) not touching the communication device and being within a first proximity distance to the communication device; and (iv) not touching the communication device and being beyond the first proximity distance and within a second proximity distance, wherein detecting whether said person is within one of two or more degrees of the local constraint comprises performing: (i) image recognition by an image capturing device of the communication device; (ii) range finding by time of flight of a range finding transmission by the communication device; (iii) human speech detection by at least one microphone of the communication device; (iv) detection of a person based on back scatter return of a radio frequency (RF) transmit signal from the transceiver; (v) touch detection detected by a sensor of the communication device; and (vi) antenna blocking detection based on detuning of at least one antenna; and
   in response to detecting a person within a particular degree of said local constraint:
   associating the degree of the local constraint to a particular graduated transmit power limit, each degree of the local constraint having corresponding transmit power limit that is inversely related to distance to one or more antennas of the communication device; and
   determining an uplink transmit power limit based on the particular transmit power limit.

9. A communication device comprising:
   a transmitter that supports a maximum transmit power;
   a memory containing a data structure containing information identifying prioritized cells for connecting by the transmitter; and
   a controller communicatively coupled to the transmitter and the memory and that enables the electronic device to:
   scan, by the transceiver, for cells within communication range of the communication device;
   determine an uplink transmit power limit of the transceiver associated with each cell that is based at least in part on the maximum transmit power;
   determine, based on a proximity of a target, whether a local constraint is applicable to the communication device, where the local constraint requires uplink transmit power to be less than the maximum transmit power, and where each local constraint represents a graduated degree of local constraint that corresponds to a specific degree of proximity of the target and that is associated with a different uplink transmit power limit;
   in response to determining that the local constraint is applicable, cut back the uplink transmit power limit to the uplink transmit power limit associated with the applicable local constraint;
   prioritize selection of the cells for connecting based at least in part on the respective uplink transmit power limit contained in the data structure, by giving a highest priority to a prioritized cell having a lowest cut back; and
   connect to the prioritized cell among the cells.

10. The communication device of claim 9, wherein:
    in determining whether said local constraint is applicable to the communication device, the controller enables the communication device to:
    determine a respective direction of each of the cells;
    determine whether any target is present in the respective direction of each of the cells;
    in response to determining that a particular target is present in the respective direction of a particular one of the cells, the controller enables the communication device to:
    determine the uplink transmit power limit based on the presence of the particular target;
    associate the determined uplink transmit power limit with the particular one of the cells; and
    connect to the prioritized cell among the cells using spatial diversity of transmitting via at least two antennas of the communication device to achieve at least a portion of the uplink transmit power.

11. The communication device of claim 9, wherein the controller enables the communication device to determine whether said local constraint is applicable by detecting a person within a proximity distance to the communication device based on one or more of: (i) image recognition by an image capturing device of the communication device; (ii) range finding by time of flight of a range finding transmission by the communication device; (iii) human speech detection by at least one microphone of the communication device; (iv) detection of a person based on back scatter return of a radio frequency (RF) transmit signal from the transceiver; (v) touch detection detected by a sensor of the communication device; and (vi) antenna blocking detection based on detuning of at least one antenna.

12. The communication device of claim 9, wherein, in determining whether said local constraint is applicable to the communication device, the controller enables the communication device to:
  determine a subset of antennas of two or more antennas of the communication device that are capable of transmitting to a particular one of the cells; and
  determine a required uplink transmit power level for each of the cells, wherein the controller:
    determines whether any of the two or more antennas are blocked by said proximity of a target;
    determines the uplink transmit power level based on available antenna gain to connect to each of the cells using at least one antenna of the two or more antennas that remain unblocked; and
    connects to the prioritized cell among the cells using the at least one antenna of the two or more antennas that remain unblocked.

13. The communication device of claim 9, wherein the controller enables the communication device to determine a required uplink transmit power level based on one or more of: (i) detecting a path loss to each of the cells; (ii) detecting any obstruction between the communication device and each of the cells; and (iii) detecting an interference source between the communication device and each of the cells.

14. The communication device of claim 9, wherein, in determining whether the local constraint is applicable to the communication device, the controller enables the communication device to:
  determine an orientation of the communication device relative to a direction to each of the cells;
  determine a corresponding antenna gain of the communication device associated with the respective orientation; and
  associate an uplink transmit limit based at least in part on the corresponding antenna gain.

15. The communication device of claim 9, wherein, in determining the required uplink transmit power level, the controller enables the communication device to:
  determine that a first cell of the one or more cells requires a first uplink transmit frequency and that a second cell of the cells requires a second uplink transmit frequency;
  associate the first and second uplink transmit frequencies with preset first and second transmit power limits that are different and that applicable within a proximity distance to a person; and
  in response to determining that said person is within the proximity distance to the communication device, adjust a corresponding first and second transmit power limit for the first and second cells to remain within the respective first and second transmit power limits.

16. The communication device of claim 9, wherein, in determining whether the local constraint is applicable to the communication device, the controller enables the communication device to:
  detect, using one or more sensors of the communication device, whether a person is within one of two or more degree of said local constraint to the communication devices, the two or more degrees of local constraint comprising at least two of: (i) touching a portion of the communication device having an underlying antenna; (ii) touching a portion of the communication device not having an underlying antenna; (iii) not touching the communication device and being within a first proximity distance to the communication device; and (iv) not touching the communication device and being beyond the first proximity distance and within a second proximity distance; and
  in response to detecting a person within a particular degree of said local constraint:
  associate the degree of the local constraint to a particular graduated transmit power limit, each degree of the local constraint having corresponding transmit power limit that is inversely related to distance to one or more antennas of the communication device; and
  determine an uplink transmit power limit based on the particular transmit power limit.

17. The communication device of claim 16, wherein, in detecting whether a person is within one of two or more degrees of the local constraint, the controller enables the communication device to perform: (i) image recognition by an image capturing device of the communication device; (ii) range finding by time of flight of a range finding transmission by the communication device; (iii) human speech detection by at least one microphone of the communication device; (iv) detection of a person based on back scatter return of a radio frequency (RF) transmit signal from the transceiver; (v) touch detection detected by a sensor of the communication device; and (vi) antenna blocking detection based on detuning of at least one antenna.

18. A computer program product comprising:
  a computer readable storage device; and
  program code on the computer readable storage device that when executed by a processor associated with an electronic device having a transceiver and a controller, the program code enables the electronic device to provide the functionality of:
  scanning, by a transceiver of a communication device, for cells within communication range of the communication device, the transceiver that supports a maximum transmit power;
  determining an uplink transmit power limit of the transceiver associated with each one of the cells that is based at least in part on the maximum transmit power;
  determining, based on a proximity of a target, whether a local constraint is applicable to the communication device, where the local constraint requires uplink transmit power to be less than the maximum transmit power, and where each local constraint has a graduated degree of local constraint that corresponds to a specific degree of proximity of the target and that is associated with a different uplink transmit power limit;
  in response to determining that the local constraint is applicable, cutting back the uplink transmit power limit to the uplink transmit power limit associated with the applicable local constraint;
  prioritizing selection of the cells for connecting, based at least in part on the respective uplink transmit power limit, by giving highest priority to a prioritized cell having a lowest cut back; and
  connecting to the prioritized cell.

19. The computer program product of claim 18, wherein, in determining whether the local constraint is applicable to the communication device, the program code enables the electronic device to provide the functionality of:
  determining a respective direction of each one of the cells;
  determining whether any target is present in the respective direction of each one of the cells; and in response to determining that a particular target is present in the respective direction of a particular one of the cells:

determining the uplink transmit power limit based on the presence of the particular target; and associating the determined uplink transmit power limit with the particular one of the cells.

* * * * *